3,332,119
TIE-DOWN DEVICE AND RIG FOR SECURING BOAT
George W. Sherwood, 1032 Downington Ave., Salt Lake City, Utah 84105
Filed Sept. 28, 1965, Ser. No. 490,932
5 Claims. (Cl. 24—131)

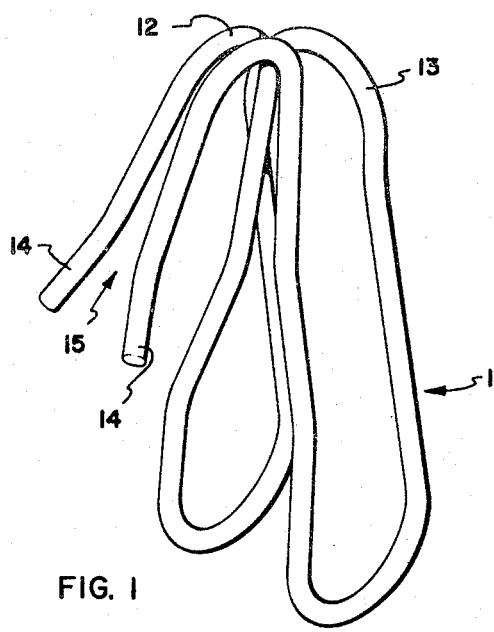
FIG. 1
FIG. 2
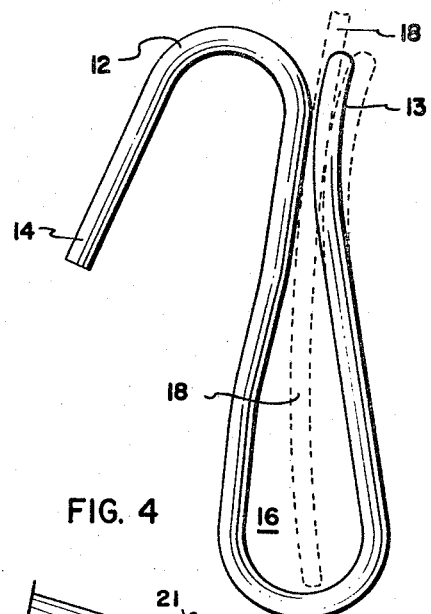
FIG. 4
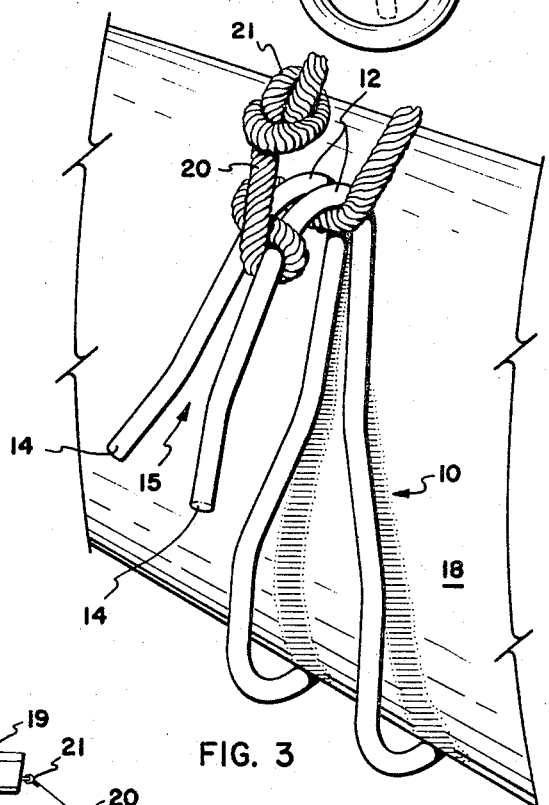
FIG. 3
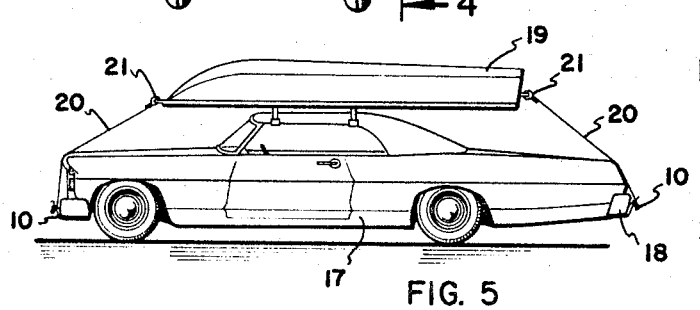
FIG. 5
INVENTOR.
GEORGE W. SHERWOOD
BY
ATTORNEYS

United States Patent Office 3,332,119
Patented July 25, 1967

ABSTRACT OF THE DISCLOSURE

A rig utilizing inverted hook tie-down devices clipped to front and rear bumpers of an automobile for anchoring front and rear tie ropes of a boat carried on top of the automobile. Each tie-down device is bent to shape from heavy wire to form a resilient clip member back-to-back and in common with a split hook member, the opening into the hook member facing oppositely from the receiving end of the clip member.

The invention

This invention is concerned with providing an easy-to-use, safe, and economical rig for securing small pleasure boats, such as row boats, skiffs, canoes, and the like, to the tops of automobiles for transport to and between bodies of water. It involves, as part of the rig, a novel, bumper-attached, tie-down device for a rope, cord, or other tie-line secured to the boat. Such tie-down device has certain attributes not limited to the particular use contemplated, and, with respect to these, is adapted for a wide range of uses as will appear hereinafter.

An outstanding feature of the rig is the provision of only two tie-lines (fore and aft of the boat) secured to the boat in any customary manner, as by tying one end of each to respective fastening devices, e.g. eye, hook, or other type of fittings, permanently attached to boat prow and stern, and anchoring the other end to a bumper-attached tie-down device of the invention, or by passing the tie-line through such a fastening device and anchoring opposite ends thereof to respective bumper-attached tie-down devices of the invention.

An outstanding feature of the tie-down device specifically adapting it for use in the rig of the invention is the provision, from a single stiff yet resilient wire bent to final formation, of a split hook member and an attachment clip member. The two end portions of the wire form an open throat for the split hook member and the intermediate portion of the wire forms an elongate loop that is bent over upon itself to provide, in common at one side, the back of the hook member and one jaw of the attachment clip member, and, at the other side, the other jaw of the clip member. The free end of such other jaw is bent back substantially against the back of the hook member substantially at the hook therefor, so resiliency of the wire enables the clip member to expand as it is pushed into place over either the front or rear bumper of an automobile and to spring back thereafter to tightly hug the bumper and thereby securely and easily and conveniently attach the device to the automobile. As shown, the elongate loop is advantageously open throughout.

A preferred feature of the tie-down device applicable to a wide variety of situations, with or without the attachment member being specifically of clip formation, is the resilient, close press relationship of the two end portions of the wire forming the split hook member as they merge to define a tightly closed throat from an open mouth entry which converges gradually to the closed throat.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

In the drawing:

FIG. 1 is a perspective view of a tie-down device conforming to this invention;

FIG. 2, a front elevation of the tie-down device of FIG. 1;

FIG. 3, a perspective view of the tie-down device of FIG. 1 shown attached to an automobile bumper;

FIG. 4, a view taken through section 4—4 of FIG. 2 with the bumper shown in phantom; and FIG. 5, a side elevation of a boat transportation arrangement utilizing the tie-down rig and tie-down device of this invention.

Referring now to the drawing:

Tie-down device 10 is formed from a length of stiff yet resilient wire, which is bent in the desired configuration to form a U-shaped loop 13 intermediate the ends of the wire, hook portion 12, and convergent throat 15. The ends 14 of the wire are mutually spaced apart to form a mouth and a throat 15, the wires then coming together in a contiguous, close-press, relationship throughout the curved portion of split hook 12.

Although it is presently preferred to use a stiff yet resilient wire 11 as the material of construction, the tie-down device 10 can also be made of other suitable materials providing the configuration of hook 12, and convergent throat 15 are retained. When wire is used it is of sufficient rigidity to maintain the wires in hook portion 12 in close press relationship during normal use. The wires at this point can be sprung apart, if desired, by applying more than the normal lateral forces to the wires.

The loop 13 of tie-down device 10 is bent over on itself to form an attachment member in the form of a spring clip 16 which can be bent to fit, in a custom manner, any support to which device 10 is intended to be attached. The degree of bend, and the location of the jaw formed by loop portion 13, with respect to the jaw formed by the back 12a of hook 12 can be controlled for any given support so that when the clip 16 is spread and installed on the support it will be retained there by the force of friction between the back of hook 12, and the front of U-shaped loop 13 which are urged together by the spring action of the wire forming clip 16. For example, if the clip is to be installed on the bumper 18 of an automobile, FIG. 3, it is preferred to have the distance between the U-shaped loop 13 and the back of the hook portion 12 less than the thickness of the bumper to provide sufficient spring action when the clip is installed to maintain the tie-down device 10 securely in place. With a standard automobile bumper it is presently preferred to reduce the distance between the back of hook 12 and loop 13 so that they are in substantially the same plane. The principal advantage of a tie-down device having a clip portion of the present invention is that the tie-down device can be quickly and easily installed on and removed from a support. Although the tie-down device having a clip is presently preferred for use on an automobile bumper, it can be used on any support to which the clip portion can be adapted.

The tie-down device having a convergent throat 15 and a hook portion 12 can advantageously be used with a variety of tie-lines such as ropes, cables and the like. The device is particularly useful with a tie-down rope 20 of the type shown in FIG. 3. In this embodiment, rope 20 has a knot 21 tied at one end. The rope is inserted into throat 15, at a position below the knot 21, and then passed under one end wire 14, over the top of hook 12 and then under hook 12. The advantage of the tying arrangement just described, is that when the rope 20 is inserted in throat 15 it is gripped thereby the spring action of wire ends 14. Although this grip is not strong enough to hold the rope against any great force, it is sufficient to keep the rope from moving while it is being secured, which is an important advantage of the invention since it enables the rope to be secured to the hook without slippage in the tying process so that the force on the rope is transmitted through the center of the split hook. If it is necessary to permit the end of the rope to go slack, when the rope is retensioned it will still be located in the same position since it has been held in position by throat 15. If the preferred wire construction is not used, the rope can still be held in place at throat 15, by wedging or forcing the rope into the throat.

In FIG. 5 there is shown a typical tie-down rig which utilizes tie-down device 10. Ropes 20 are attached at one end to boat 19, and at their opposite ends to tie-down devices 10, which are attached to the front and rear bumpers 18 of automobile 17. Fittings such as screw eyes, hooks and the like are provided at 21 on the boat for attachment of the rope thereto. The boat can advantageously be held in place by only two tie-lines secured to the fittings at 21 at one end and anchored to a bumper attached tie-down device 10, or by passing the tie-line through the fitting and anchoring its opposite ends to respective bumper attached tie-down devices 21. The boat rests on cross members 22 for support. The combination of the ropes 20, attached to the tie-down devices 10, in the manner shown in FIG. 3 and hereinbefore described provides particular advantages with respect to the arrangement since the boat is held securely in place, and can be easily removed. In addition the spring action of the wire used throughout the preferred device 10 allows sufficient flexing of the device to prevent severe stresses on the boat which could result in damage thereto.

Although the presently contemplated use of this tie-down device is with automobiles, it can also be used for a variety of purposes wherever its characteristics will render it useful. Thus, the tie-down device can be used in various tie-down arrangements on boats and docks, as a part of a clothes line, in securing tent ropes and flag pole ropes, and other uses too numerous to mention.

Whereas there is here illustrated and specifically described a certain preferred construction of apparatus which is presently regarded as the best mode of carrying out the invention, it should be understood that various changes can be made and other constructions adopted without departing from the inventive subject matter particularly pointed out and claimed herebelow.

I claim:

1. A tie-down device comprising a single length of stiff yet resilient wire bent to provide a split hook member and an attachment member, said split hook member being formed by the two opposite end portions of said wire, which converge to a close press relationship from an open mouth formed by mutually spaced ends of the wire and said attachment member being formed by intermediate portions of said wire and having an elongate loop bent over upon itself to provide, in common at one side thereof, the back of said hook member and one jaw of the attachment clip member, and, at the other side, the other jaw of the attachment clip member, the said other jaw terminating substantially against the back of the hook member substantially at the hook thereof, and the loop being open throughout.

2. A rig for securing a boat to the top of an automobile comprising at least one tie-down device attached to the bumper of an automobile, the tie-down device comprising a single length of stiff yet resilient wire bent to provide a split hook member and an attachment member, said split hook member being formed by the two opposite end portions of said wire, which converge to a close press relationship from an open mouth formed by mutually spaced ends of the wire, and said attachment member having an elongate loop bent over upon itself to provide, in common at one side thereof, the back of said hook member and one jaw of the attachment clip member, and, at the other side, the other jaw of the attachment clip member, said attachment clip member securing the tie-down device to an automobile bumper and a tie-line secured at one end to the tie-down device and at the other end to a boat.

3. A rig as recited in claim 2, having two tie-down devices and two tie-lines.

4. A rig as recited in claim 2, wherein four tie-down devices and two tie-lines are provided, the tie-down devices being attached to opposite ends of a single tie-line passing through an attachment device at the prow and stern of a boat.

5. A rig as recited in claim 2, wherein said tie-lines have a knot in one end thereof, the line being secured in the throat of the tie-down device at a position below said knot and then passing under one wire of the throat over said curved portion and then under said curved portion.

References Cited

UNITED STATES PATENTS

| | | | |
|---|---|---|---|
| 641,282 | 1/1900 | Elliott | 24—131 |
| 724,430 | 4/1903 | Carlson. | |
| 1,423,530 | 7/1922 | Lake | 24—131 |
| 2,252,243 | 8/1941 | Zoppelt | 24—130 |
| 2,470,848 | 5/1949 | Guest | 224—42.03 XR |
| 2,908,522 | 10/1959 | Glave | 248—361 X |

BERNARD A. GELAK, *Primary Examiner.*